US008669677B2

(12) United States Patent
Urano

(10) Patent No.: US 8,669,677 B2
(45) Date of Patent: Mar. 11, 2014

(54) WIRELESS POWER FEEDER, WIRELESS POWER RECEIVER, AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 224 days.

(21) Appl. No.: 13/250,054

(22) Filed: Sep. 30, 2011

(65) Prior Publication Data

US 2012/0161533 A1    Jun. 28, 2012

Related U.S. Application Data

(60) Provisional application No. 61/427,607, filed on Dec. 28, 2010.

(51) Int. Cl.
*H01F 27/42* (2006.01)
*H01F 37/00* (2006.01)
*H01F 38/00* (2006.01)

(52) U.S. Cl.
USPC ............................................. 307/104; 324/300

(58) Field of Classification Search
USPC ............................................. 307/104; 324/300
See application file for complete search history.

(56) References Cited

U.S. PATENT DOCUMENTS

| | | | |
|---|---|---|---|
| 6,291,994 B1 * | 9/2001 | Kim et al. | ........................ 324/300 |
| 7,741,734 B2 | 6/2010 | Joannopoulos et al. | |
| 2007/0222542 A1 | 9/2007 | Joannopoulos et al. | |
| 2008/0211320 A1 | 9/2008 | Cook et al. | |
| 2008/0278264 A1 | 11/2008 | Karalis et al. | |
| 2009/0015075 A1 | 1/2009 | Cook et al. | |
| 2009/0045772 A1 | 2/2009 | Cook et al. | |
| 2009/0051224 A1 | 2/2009 | Cook et al. | |
| 2009/0058189 A1 | 3/2009 | Cook et al. | |
| 2009/0072627 A1 | 3/2009 | Cook et al. | |
| 2009/0072628 A1 | 3/2009 | Cook et al. | |
| 2009/0072629 A1 | 3/2009 | Cook et al. | |
| 2009/0079268 A1 | 3/2009 | Cook et al. | |
| 2009/0102292 A1 | 4/2009 | Cook et al. | |

(Continued)

FOREIGN PATENT DOCUMENTS

| | | |
|---|---|---|
| JP | A-2006-230032 | 8/2006 |
| JP | A-2010-166693 | 7/2010 |
| WO | WO 2006/022365 A1 | 3/2006 |

OTHER PUBLICATIONS

International Report on Patentability issued in Application No. PCT/JP2011/078813 dated Jul. 18, 2013.

*Primary Examiner* — Stephen W Jackson
*Assistant Examiner* — Toan Vu
(74) *Attorney, Agent, or Firm* — Oliff PLC

(57) ABSTRACT

A wireless power feeder which performs power feed to a wireless power receiver having a power receive resonance circuit including a power receive coil and a power receive capacitor, this wireless power feeder including: a power feed coil; a resonance current detector; and a control circuit; wherein the power feed coil does not substantially constitute a resonance circuit; the current detector has a detection resonance circuit including a detection coil and a detection capacitor, and detects a resonance current of the power receive resonance circuit; the winding region of the detection coil in the current detector is smaller than the winding region of the power feed coil; and the detection coil in the current detector is disposed such that the central winding axis thereof forms an angle of not less than 80° and not more than 100° with respect to magnetic field vectors generated by the power feed coil.

10 Claims, 17 Drawing Sheets

(56) References Cited

U.S. PATENT DOCUMENTS

| | | |
|---|---|---|
| 2009/0134712 A1 | 5/2009 | Cook et al. |
| 2009/0167449 A1 | 7/2009 | Cook et al. |
| 2009/0179502 A1 | 7/2009 | Cook et al. |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0243397 A1 | 10/2009 | Cook et al. |
| 2009/0267709 A1 | 10/2009 | Joannopoulos et al. |
| 2009/0267710 A1 | 10/2009 | Joannopoulos et al. |
| 2009/0273242 A1 | 11/2009 | Cook |
| 2009/0284083 A1 | 11/2009 | Karalis et al. |
| 2010/0038970 A1 | 2/2010 | Cook et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2011/0127846 A1* | 6/2011 | Urano .......................... 307/104 |
| 2012/0286584 A1* | 11/2012 | Park et al. .................... 307/104 |

\* cited by examiner

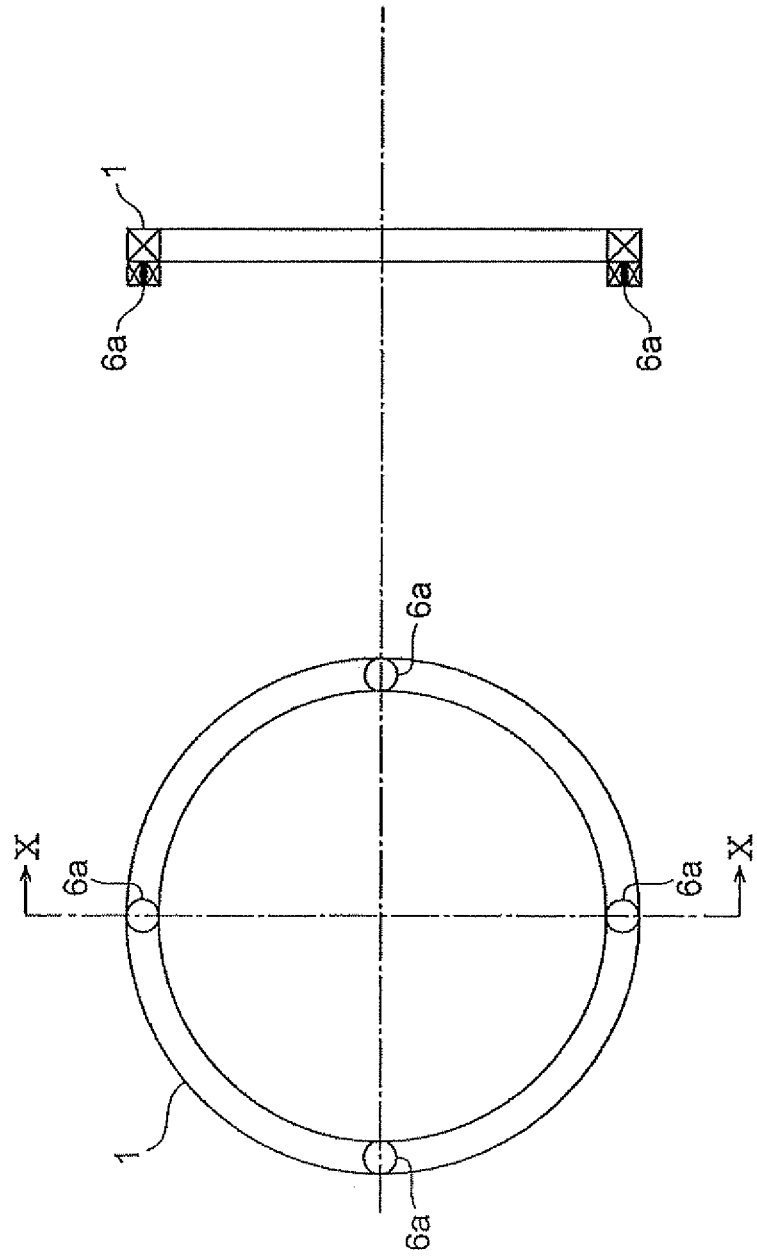

WIRELESS POWER FEEDER, WIRELESS POWER RECEIVER, AND WIRELESS POWER TRANSMISSION SYSTEM

CROSS REFERENCE TO RELATED APPLICATION

This application claims priority to U.S. Provisional Application No. 61/427,607 filed on Dec. 28, 2010 by the same Applicant, which is hereby incorporated by reference in its entirety.

BACKGROUND OF THE INVENTION

1. Field of the Invention

The present invention relates to a wireless power feeder, a wireless power receiver, and a wireless power transmission system for transmitting power by a non-contact method.

2. Related Background Art

Japanese Patent Application Publication No. 2010-166693 discloses a wireless power transmission system which transmits power by a non-contact (wireless) method from a wireless power feeder to a wireless power receiver. In this wireless power transmission system, power is transmitted by using an electromagnetic induction effect. Therefore, the wireless power feeder 10 comprises a power feed resonance circuit having a power feed coil 14 and a power feed capacitor 15, and furthermore, the wireless power receiver 20 also comprises a power receive resonance circuit having a power receive coil 21 and a power receive capacitor 22. The power feed coil 14 and the power receive coil 21 constitute a power feed transformer Tf, and power transmission is carried out by a non-contact method using an electromagnetic induction effect between the coils.

In a wireless power transmission system which uses an electromagnetic induction effect in this way, power transmission is performed efficiently with a power factor close to "1" for the transmitted power. However, if the relative distance between the power feed coil 14 and the power receive coil 21 changes, then the mutual inductance of the coils changes and the power factor of the transmitted power declines. As a result of this, it becomes impossible to carry out efficient power transmission.

In respect of this point, Japanese Patent Application Publication No. 2010-166693 discloses an invention which finds the frequency of a resonance current of a power feed resonance circuit that corresponds to change in the mutual inductance of a power feed transformer, and sets the frequency of the voltage supplied to the power feed resonance circuit to a value corresponding to this frequency of the resonance current. For this reason, the wireless power feeder 10 has a frequency control circuit 31 in the controller 30 which performs PWM control of a voltage type inverter 13 which is connected to the power feed resonance circuit. The frequency control circuit 31 detects the output current of the voltage type inverter 13 and controls the phase frequency of the output voltage of the voltage type inverter 13, in such a manner that the power factor of the output power of the voltage type inverter 13 becomes 1. More specifically, the frequency control circuit 31 controls the voltage type inverter 13 so as to carry out zero current switching.

In recent years, a wireless power transmission system for transmitting power by a non-contact (wireless) method has been proposed, in which power is transmitted by using a magnetic field resonance effect between a wireless power feeder and a wireless power receiver. In this wireless power transmission system, the wireless power feeder comprises a power feed resonance circuit having a power feed coil and a power feed capacitor, and the wireless power receiver also comprises a power receive resonance circuit having a power receive coil and a power receive capacitor. Power transmission is performed by a non-contact method between the wireless power feeder and the wireless power receiver, by using this magnetic field resonance effect.

SUMMARY OF THE INVENTION

The present inventor discovered that when the technology disclosed in Japanese Patent Application Publication No. 2010-166693 is applied to a wireless power transmission system using a magnetic field resonance effect, then in a system which comprises two resonance circuits, a power feed resonance circuit and a power receive resonance circuit, there are two frequencies at which the power factor of the transmitted power becomes 1. Consequently, in a wireless power transmission system of this kind, there is a risk of malfunction, when performing phase frequency control to achieve a power factor of 1 for the transmitted power.

Therefore, it is an object of the present invention to provide a wireless power feeder, a wireless power receiver and a wireless power transmission system whereby efficient power transmission can be performed without malfunction, when performing power transmission by a non-contact method using a magnetic field resonance effect.

The wireless power feeder according to the present invention is a wireless power feeder which performs power feed by a non-contact method to a wireless power receiver having a power receive resonance circuit including a power receive coil and a power receive capacitor, comprising: a power feed coil; a resonance current detector which detects a resonance current of the power receive resonance circuit; and a control circuit which performs power feed from the power feed coil to the power receive coil, on the basis of a magnetic field resonance effect between the power feed coil and the power receive coil, by supplying AC current to the power feed coil, and which associates a frequency of the AC current with a frequency of the resonance current detected by the resonance current detector; wherein the power feed coil does not substantially constitute a resonance circuit; the resonance current detector has a detection resonance circuit which includes a detection coil and a detection capacitor, and detects a resonance current of the power receive resonance circuit on the basis of a magnetic field resonance effect between the detection coil and the power receive coil; the winding region of the detection coil in the resonance current detector is smaller than the winding region of the power feed coil; and the detection coil in the resonance current detector is disposed such that the central winding axis of the detection coil forms an angle of not less than 80° and not more than 100° with respect to magnetic field vectors generated by the power feed coil.

Here, "does not substantially constitute a resonance circuit" means that the power feed coil does not form a resonance circuit of which the resonance frequency is the resonance frequency of the power receive resonance circuit, but does not exclude the fact that the power feed coil may resonate incidentally with any of the circuit elements. For example, "does not substantially constitute a resonance circuit" means that a capacitor is not provided in series or in parallel with the power feed coil, in order to form a resonance circuit having a resonance frequency which is the resonance frequency of the power receive resonance circuit.

Furthermore, a "magnetic field resonance effect between the power feed coil and the power receive coil" means a resonance effect of the power receive resonance circuit based on an AC magnetic field generated by the power feed coil. When an AC current is supplied to the power feed coil, an AC magnetic field is produced by the power feed coil. By this means, the power feed coil and the power receive coil are magnetic field coupled, and the power receive resonance circuit resonates. In this, for example, if the frequency of the AC current and the resonance frequency of the power receive resonance circuit are associated, then even if the power feed coil itself does not resonate, it is still possible to achieve a power factor of 1 for the transmitted power, and highly efficient power transmission can be performed. For example, "the frequency of the AC current and the resonance frequency of the power receive resonance circuit are associated" means that the frequency of the AC current and the resonance frequency of the power receive resonance circuit are substantially matching. Even if the frequency of the AC current and the resonance frequency of the power receive resonance circuit are not completely matching, it is still possible to raise the power factor of the transmitted power provided that these frequencies are substantially matching within a range of error of about ±20%, for example, and therefore highly efficient power transmission can be achieved. Accordingly, "the frequency of the AC current and the resonance frequency of the power receive resonance circuit are associated" includes a case where the frequency of the AC current and the resonance frequency of the power receive resonance circuit are substantially matching within a range of error of about ±20%.

Furthermore, "detects the resonance current of the power receive resonance circuit" means detecting a signal corresponding to the resonance current flowing in the power receive resonance circuit (information about the resonance current).

In this way, according to the wireless power feeder, since the power feed coil does not substantially constitute a resonance circuit, there is one frequency at which the power factor of the transmitted power becomes 1. Consequently, it is possible to prevent malfunction when implementing control so that the power factor of the transmitted power is 1, in other words, in control which associates the frequency of the AC current supplied to the power feed coil with the frequency of the resonance current of the power receive resonance circuit, by means of a resonance current detector and control circuit.

In a wireless power feeder of this kind, normally, the resonance current of the power receive resonance circuit is detected by using a current sensor which detects a current flowing in a power feed coil, or a current transformer. However, if the resonance current is detected in this way, the power feed coil does not substantially constitute a resonance circuit, and therefore, if the distance between the power feed coil and the power receive coil becomes larger, for example, then it may be difficult to detect the resonance current of the power receive resonance circuit accurately, and there has been room for improvement.

Therefore, in this wireless power feeder, the resonance current of the power receive resonance circuit is detected by a non-contact method based on a magnetic field resonance effect, by using a resonance current detector. Furthermore, the winding region of the detection coil in the resonance current detector is smaller than the winding region of the power feed coil, and this detection coil is disposed in such a manner that the central winding axis thereof forms an angle of not less than 80° and not more than 100° with respect to the magnetic field vectors (lines of magnetic force) generated by the power feed coil. By this means, the resonance current detector is able to obtain information about the state of resonance of the power receive resonance circuit by a non-contact method, by using the magnetic field resonance effect between the detection coil and the power receive coil, as well as being able to detect accurately the magnetic field of the power receive coil, without detecting the magnetic field of the power feed coil.

The length of the winding region of the detection coil in the resonance current detector, which is the length of the winding region of the detection coil in the radial direction of winding of the power feed coil, is no more than 1/10 of the length of the winding region of the power feed coil in the radial direction of winding. Moreover, the length of the winding region of the detection coil in the resonance current detector, which is the length of the winding region of the detection coil in the radial direction of winding of the power feed coil, is no more than the length of the coil wire region of the power feed coil in the radial direction of winding. According to this composition, the resonance current detector is able to detect the magnetic field of the power receive coil accurately, without detecting the magnetic field of the power feed coil.

Furthermore, the detection coil in the resonance current detector described above is disposed over the wire of the power feed coil. According to this composition, the resonance current detector is able to detect the magnetic field of the power receive coil accurately, without detecting the magnetic field of the power feed coil.

Furthermore, the resonance current detector described above further comprises a detection resistance element for reducing the Q value of the detection resonance circuit. The purpose of the resonance current detector is to monitor the resonance frequency on the power receiver side, and it is not necessary to pass a large current through the detection coil.

Furthermore, the wireless power feeder further comprises: a plurality of resonance current detectors; and an adder which adds the output signals from the plurality of resonance current detectors; and the control circuit associates the frequency of the AC current and the frequency of the output signal from the adder. According to this composition, it is possible to detect the resonance current of the power receive resonance circuit efficiently, not only in cases where the central winding axis of the power feed coil and the central winding axis of the power receive coil match each other (the power receive coil is positioned directly over the power feed coil), and the power feed coil and the power receive coil are mutually parallel, but also in cases where the power receive coil is displaced diagonally with respect to the power feed coil (cases where the coils are displaced relatively in the lateral direction and are also non-parallel).

A further wireless power feeder according to the present invention is a wireless power feeder which performs power feed by a non-contact method to a wireless power receiver having a power receive resonance circuit including a power receive coil and a power receive capacitor, the wireless power feeder comprising: a power feed coil; a resonance current detector which detects a resonance current of the power receive resonance circuit; and a control circuit which performs power feed from the power feed coil to the power receive coil, on the basis of a magnetic field resonance effect between the power feed coil and the power receive coil, by supplying AC current to the power feed coil, and which associates a frequency of the AC current with a frequency of the resonance current detected by the resonance current detector; wherein the power feed coil does not substantially constitute a resonance circuit; the resonance current detector has a magnetic field detection element and detects a resonance current of the power receive resonance circuit, on the basis of the magnetic field of the power receive coil; the outer shape of the magnetic detection element in the resonance current detector is smaller than the winding region of the power feed coil; and the magnetic detection element in the resonance current detector is disposed in such a manner that the magnetic detection direction forms an angle of not less than 80° and not more than 100° with respect to magnetic field vectors generated by the power feed coil.

With this wireless power feeder also, since the power feed coil does not substantially constitute a resonance circuit, there is one frequency at which the power factor of the transmitted power becomes 1. Consequently, it is possible to prevent malfunction when implementing control so that the power factor of the transmitted power is 1, in other words, in control which associates the frequency of the AC current supplied to the power feed coil with the frequency of the resonance current of the power receive resonance circuit, by means of a resonance current detector and control circuit.

Furthermore, in this wireless power feeder, the outer shape of the magnetic detection element in the resonance current detector is smaller than the winding region of the power feed coil, and this magnetic detection element is disposed in such a manner that the magnetic detection direction thereof forms an angle of not less than 80° and not more than 100° with respect to the magnetic field vectors (lines of magnetic force) generated by the power feed coil. Accordingly, the resonance current detector is able to detect the magnetic field of the power receive coil accurately, without detecting the magnetic field of the power feed coil.

The wireless power receiver according to the present invention is a wireless power receiver which acquires power by a non-contact method from the wireless power feeder described above, comprising a power receive resonance circuit including a power receive coil and a power receive capacitor, the wireless power receiver acquiring power from the power feed coil by the power receive coil on the basis of a magnetic field resonance effect between the power feed coil in the wireless power feeder and the power receive coil in the wireless power receiver.

According to this wireless power receiver, power is acquired by a non-contact method from the wireless power feeder described above, and therefore it is possible to prevent malfunction when performing control to achieve a power factor of 1 for the transmitted power. Furthermore, the resonance current detector is able to detect the magnetic field of the power receive coil accurately, without detecting the magnetic field of the power feed coil.

The wireless power transmission system according to the present invention is a wireless power transmission system which performs power transmission by a non-contact method between a wireless power feeder described above and a wireless power receiver described above, wherein power transmission is performed from the power feed coil to the power receive coil on the basis of a magnetic field resonance effect between the power feed coil in the wireless power feeder and the power receive coil in the wireless power receiver.

According to this wireless power transmission system, power is acquired by a non-contact method from the wireless power feeder described above, and therefore it is possible to prevent malfunction when performing control to achieve a power factor of 1 for the transmitted power. Furthermore, it is possible to detect the magnetic field of the power receive coil accurately, without detecting the magnetic field of the power feed coil.

According to the present invention, it is possible to transmit power efficiently without malfunction, when performing power transmission by a non-contact method using a magnetic field resonance effect.

BRIEF DESCRIPTION OF THE DRAWINGS

FIGS. 10A and 10B are a plan view diagram and a cross-sectional diagram showing the physical structure of a power feed coil and a detection coil shown in FIG. 11;

DESCRIPTION OF THE PREFERRED EMBODIMENTS

Figure 1:
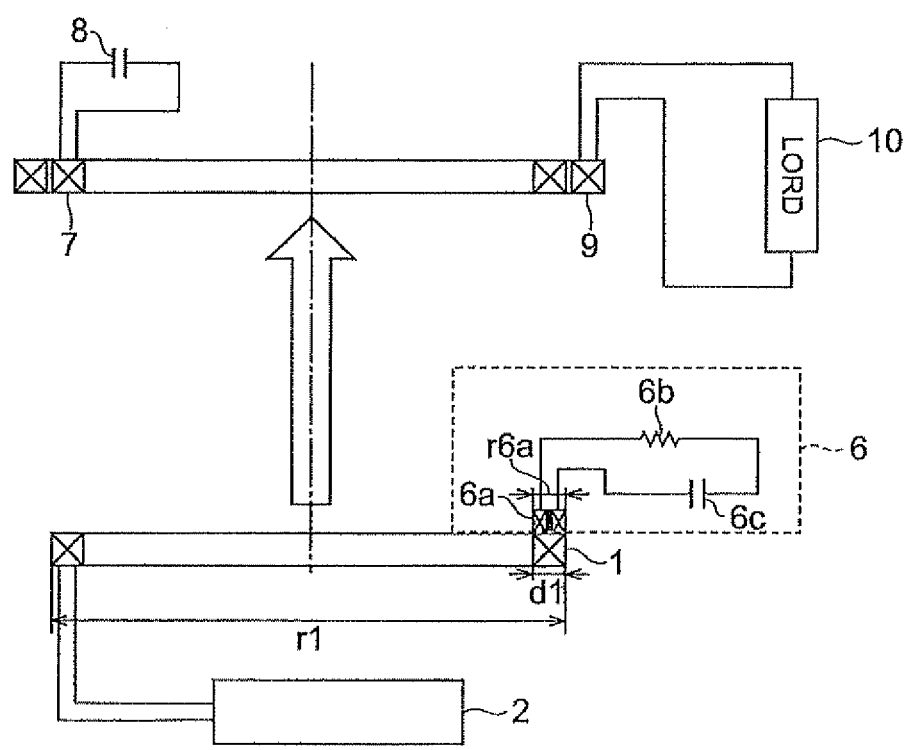
FIG. 1 is a cross-sectional diagram showing the physical structure of a power feed coil, a detection coil, a power receive coil and a power receive load coil which are shown in FIG. 3.

Below, a preferred embodiment of the present invention is described in detail with reference to the drawings. Parts which are the same or equivalent in the respective drawings are labeled with the same reference numerals.

First Embodiment

Figure 3:
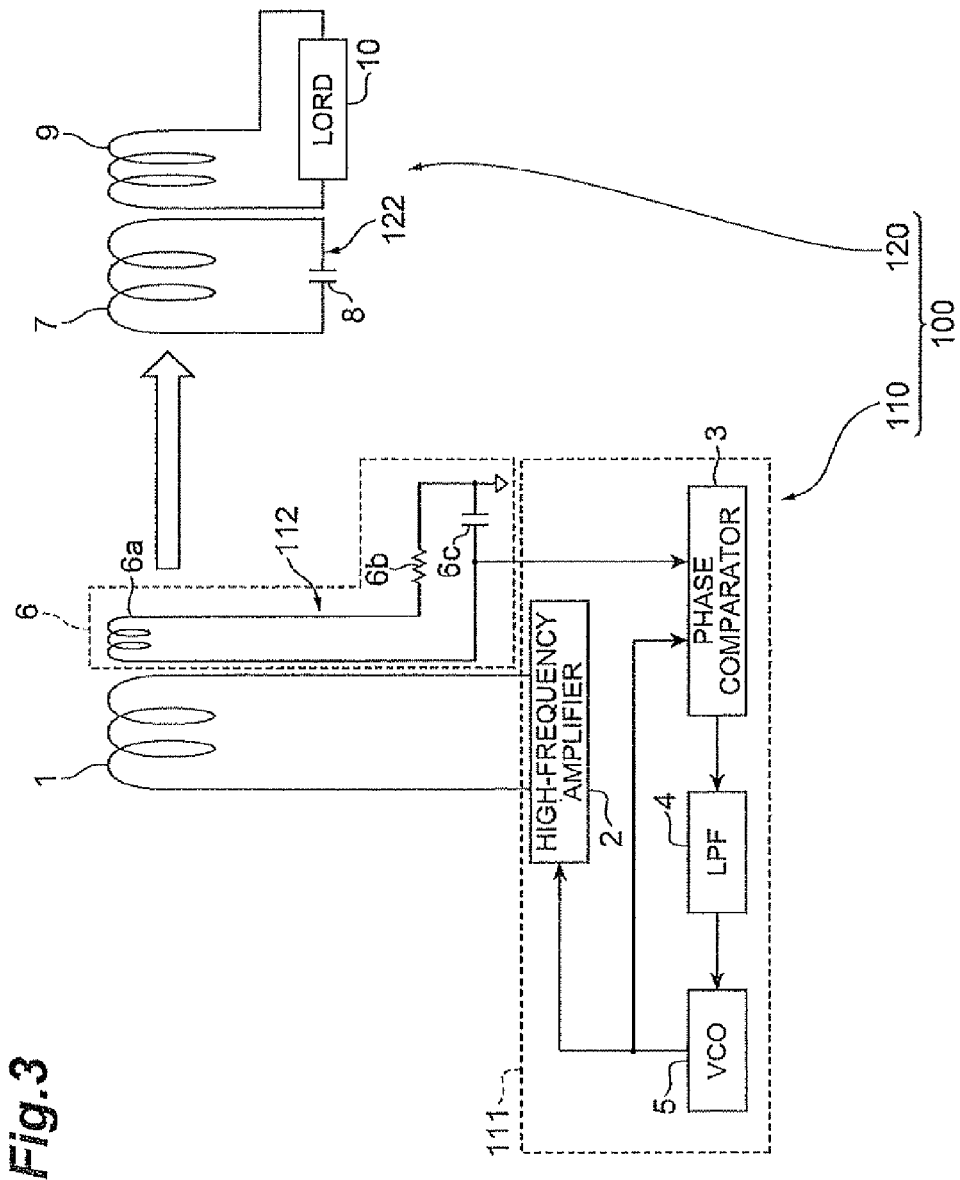
FIG. 3 is a diagram showing the electrical composition of a wireless power transmission system, a wireless power feeder and a wireless power receiver relating to a first embodiment of the present invention.

FIG. 3 is a diagram showing the electrical composition of a wireless power transmission system relating to a first embodiment of the present invention. The wireless power transmission system 100 shown in FIG. 3 comprises a wireless power feeder 110 and a wireless power receiver 120, and performs power transmission by a non-contact method from the wireless power feeder 110 to the wireless power receiver 120.

The wireless power feeder 110 comprises a power feed coil 1, a resonance current detector 6, and a control circuit 111. On the other hand, the wireless power receiver 120 comprises a power receive resonance circuit 122 comprising a power receive coil 7 and a power receive capacitor 8.

In the wireless power feeder 110, the control circuit 111 supplies an AC current (for example, a square wave or sinusoidal wave current) to the power feed coil 1, whereby power is supplied from the power feed coil 1 to the power receive coil 7 on the basis of a magnetic field resonance effect between the power feed coil 1 and the power receive coil 7. Here, the "magnetic field resonance effect between the power feed coil 1 and the power receive coil 7" means a resonance effect of the power receive resonance circuit 122 based on an AC magnetic field which is produced by the power feed coil 1. When an AC current is supplied to the power feed coil 1, an AC magnetic field is produced by the power feed coil 1. By this means, the power feed coil 1 and the power receive coil 7 are magnetically coupled, and the power receive resonance circuit 122 resonates. In this, the control circuit 111 makes the frequency of the AC current match the frequency of the resonance current of the power receive resonance circuit 122 which is detected by the resonance current detector 6. In so doing, even if the power feed coil 1 itself does not resonate, it is possible to achieve a power factor of 1 for the transmitted power, and highly efficient power transmission can be performed.

In this way, in the wireless power feeder 110, the power feed coil 1 does not substantially constitute a resonance circuit. Here, "does not substantially constitute a resonance circuit" means that the power feed coil does not form a resonance circuit of which the resonance frequency is the resonance frequency of the power receive resonance circuit 122, but does not exclude the fact that the power feed coil 1 may resonate incidentally with any of the circuit elements. For example, "does not substantially constitute a resonance circuit" means that a capacitor is not provided in series or in parallel with the power feed coil 1, in order to form a resonance circuit having a resonance frequency which is the resonance frequency of the power receive resonance circuit 122.

In the wireless power feeder 110, the stronger the magnetic field coupling between the power feed coil 1 and the power receive coil 7, the greater the effect on the resonance frequency of the power receive resonance circuit 122. More specifically, the resonance frequency of the power receive resonance circuit 122 in a state where the power feed coil 1 and the power receive coil 7 are in sufficiently close proximity to enable magnetic field coupling therebetween diverges from the resonance frequency of the power receive resonance circuit 122 alone, in a state where the power feed coil 1 and the power receive coil 7 are sufficiently distanced from each other to enable magnetic field coupling therebetween to be ignored. By supplying an AC current of a frequency close to the resonance frequency of the power receive resonance circuit 122, to the power feed coil 1, it is possible to achieve wireless power feed based on a magnetic field resonance mechanism.

In the wireless power receiver 120, power is supplied to the load 10 via a power receive load coil 9 which is magnetic field coupled to the power receive coil 7. By this means, it is possible to suppress the decline in the Q value of the power receive resonance circuit caused by the load 10.

Next, the control circuit 111 in the wireless power feeder 110 will be described in detail. The control circuit 111 comprises a high-frequency amplifier 2, a phase comparator 3, a low-pass filter (LPF) 4 and a voltage-controlled oscillator (VCO) 5.

The phase comparator 3 generates a pulse voltage corresponding to the phase difference between the voltage corresponding to the resonance current of the power receive resonance circuit 122 which is detected by the resonance current detector 6 and the output voltage from the VCO 5, and outputs it to the LPF 4. The LPF 4 averages the pulse voltage from the phase comparator 3 and outputs the pulse voltage to the VCO 5. The VCO 5 takes the voltage from the LPF 4 as a control voltage, and generates an AC voltage having a frequency corresponding to this voltage. In this way, the phase comparator 3, the LPF 4 and the VCO 5 constitute a so-called PLL circuit, and generate an AC voltage having a phase frequency corresponding to the phase frequency of the resonance current of the power receive resonance circuit 122 which is detected by the resonance current detector 6.

The high-frequency amplifier 2 supplies AC current having a phase frequency which matches the phase frequency of the resonance current in the power receive resonance circuit 122, to the power feed coil 1, in accordance with the AC voltage.

Next, the resonance current detector 6 in the wireless power feeder 110 will be described in detail. The resonance current detector 6 comprises a serial detection resonance circuit 112 comprising a detection coil 6a, a detection resistance element 6b and a detection capacitor 6c. The inductance of the detection coil 6a, the capacitance of the detection capacitor 6c, the inductance of the power receive coil 7 and the capacitance of the power receive capacitor 8 are set in such a manner that the resonance frequency of the detection resonance circuit 112 is substantially equal to the resonance frequency of the power receive resonance circuit 122, in a state where the detection coil 6a and the power receive coil 7 are distanced from each other sufficiently for the magnetic field coupling therebetween to be ignored. Consequently, the resonance current of the power receive resonance circuit 122 is detected on the basis of the magnetic field resonance effect between the detection coil 6a and the power receive coil 7 (a magnetic field resonance effect of the detection resonance circuit 112 and the power receive resonance circuit 122). By this means, even if the power feed coil does not substantially constitute a resonance circuit, the resonance current detector 6 is still able to obtain information about the resonance state of the power receive resonance circuit 122, by a non-contact method, by using a magnetic field resonance effect. In the present embodiment, voltage between the terminals of the detection capacitor 6c is supplied to the phase comparator 3 as phase frequency information of the resonance current of the power receive resonance circuit 122. The detection capacitor 6c may be formed as a stray capacitance of the detection coil 6a or as a lumped element, and may form a resonance circuit with the detection coil 6a.

FIG. 1 is a cross-sectional diagram showing the physical structure of the power feed coil 1, the detection coil 6a, the power receive coil 7 and the power receive load coil 9 which are shown in FIG. 3. FIG. 1 shows the electrical composition of the peripheral circuit elements of these coils.

Figure 2A:
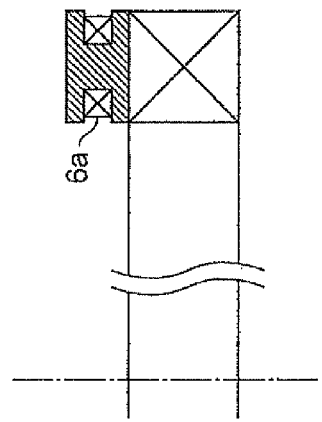
FIGS. 2A to 2D are diagrams showing a plurality of examples of detection coils shown in FIG. 1.
Figure 2B:
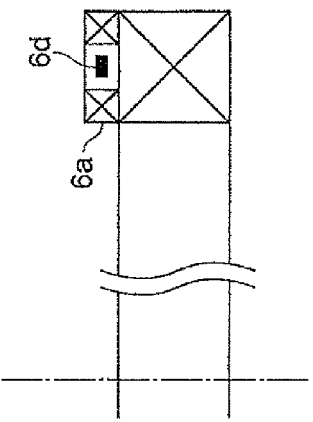
Figure 2C:
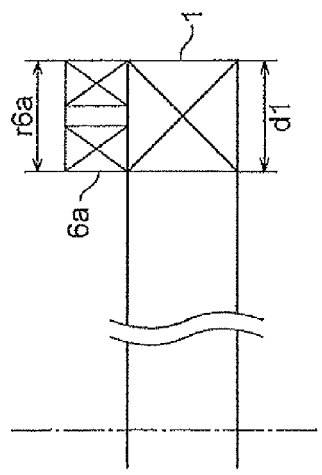

The power feed coil 1 and the power receive coil 7 are provided in mutually opposing fashion, and the power receive load coil 9 is wound about the outer circumference of the power receive coil 7. The detection coil 6a is located adjacently to the power feed coil 1, between the power feed coil 1 and the power receive coil 7. The power feed coil 1 may be, for example, a spiral coil, a solenoid coil, or a loop coil. Furthermore, as shown in FIG. 2, the detection coil 6a may be a air core coil (FIG. 2A), a coil having a round cylindrical ferrite piece as a magnetic core (FIG. 2B), and a coil having drum-shaped ferrite as a magnetic core (FIG. 2C).

Figure 16A:
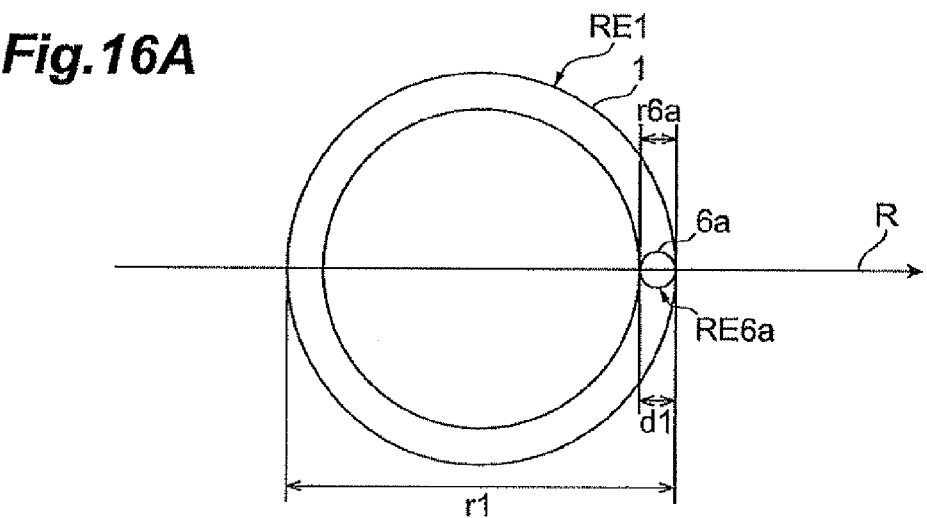
FIGS. 16A to 16C are diagrams showing a plurality of examples of the shape of a detection coil and a power feed coil.
Figure 16B:
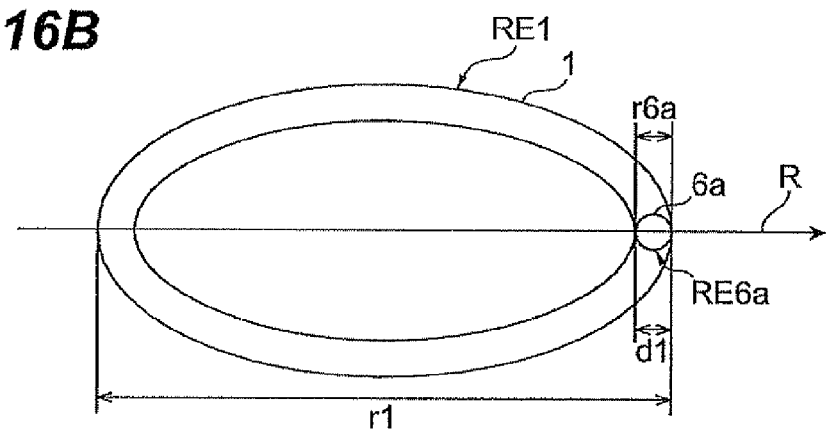
Figure 16C:
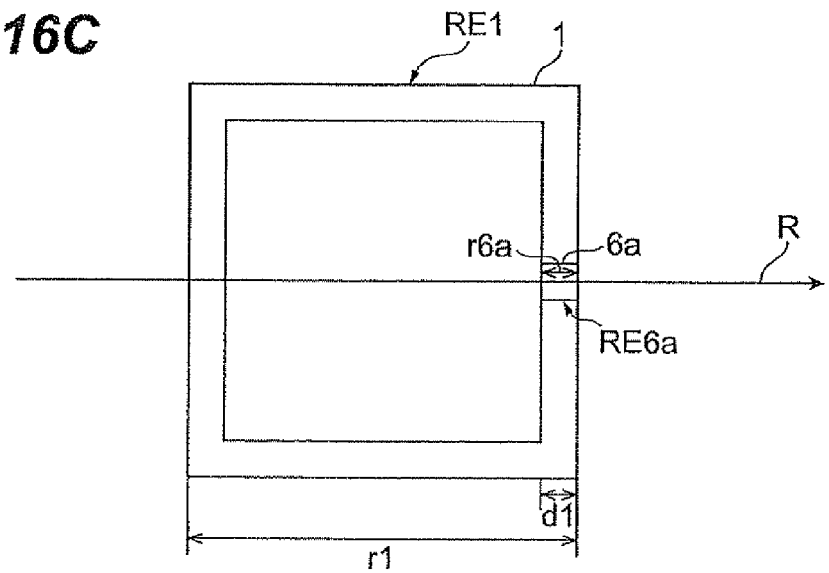

Furthermore, as shown in FIG. 16, the power feed coil 1 and the detection coil 6a may be wound in a circular shape (FIG. 16A), in an elliptical shape (FIG. 16B), in a rectangular shape (FIG. 16C) or in a polygonal shape. Desirably, the power receive coil 7 and the power receive load coil 9 have a shape corresponding to the power feed coil 1.

The winding region RE6a of the detection coil 6a is sufficiently smaller than the winding region RE1 of the power feed coil 1 (for example, desirably, no more than 1/10, and more desirably, no more than 1/100, in terms of the surface area ratio of the winding regions of the coils). For example, the length (winding diameter in the case of a circular shape) r6a of the winding region RE6a of the detection coil 6a in the radial direction R of the power feed coil 1 is desirably no less than 1/10 times the length (winding diameter in the case of a circular shape) r1 of the winding region RE1 of the power feed coil 1 in the radial direction R. More desirably, the length r6a of the winding region RE6a of the detection coil 6a in the radial direction R of the coil is no more than the length d1 of the coil wire region of the power feed coil 1 in the radial direction R (the winding width of the coil wire; in other words, the diameter of the coil wire if the number of windings of the power feed coil 1 is one). If the winding region RE6a of the detection coil 6a is relatively large, then the magnetic field generated by the detection coil 6a becomes relatively large, and this field affects the power feed coil 1 and the power receive coil 7. However, according to the present embodiment, since the winding region RE6a of the detection coil 6a is relatively small, then it is possible to make the strength of the magnetic field produced by the detection coil 6a sufficiently small, and the effects on the power feed coil 1 and the power receive coil 7 can be reduced. Furthermore, if the winding region RE6a of the detection coil 6a is relatively large, then the power feed coil 1 and the detection resonance circuit 112 constitute a resonance circuit, and there are two resonance frequencies, which is undesirable, but according to the present embodiment, the winding region RE6a of the detection coil 6a is relatively small, and therefore the power feed coil 1 and the detection resonance circuit 112 do not constitute a resonance circuit.

Figure 17A:
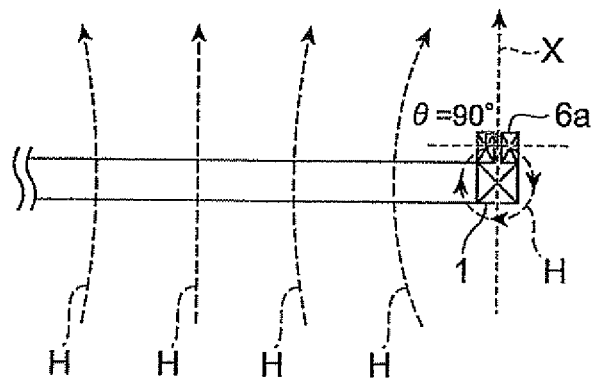
FIGS. 17A to 17C are diagrams showing a plurality of examples of arrangement of a detection coil with respect to a power feed coil.
Figure 17B:
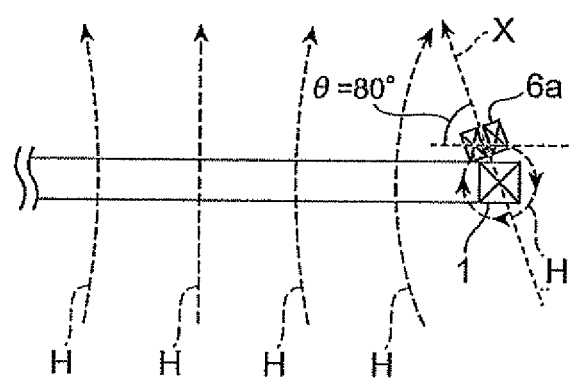
Figure 17C:
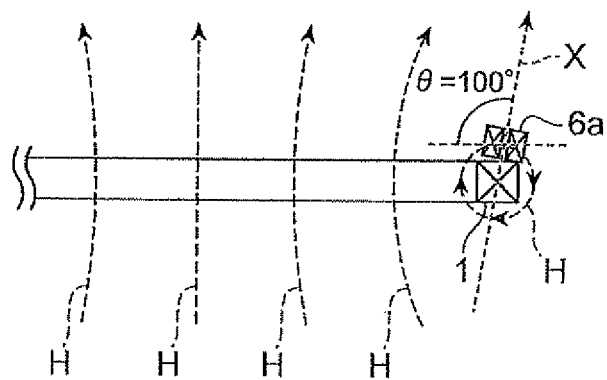

Furthermore, as shown in FIGS. 17A to 17C, the detection coil 6a is arranged in such a manner that the central winding axis X of the coil is in the range of an angle of 90°±10° with respect to the magnetic field vectors (lines of magnetic force) H generated by the power feed coil 1. By this means, the detection coil 6a is not affected by the magnetic field of the power feed coil 1. The central winding axis X of the detection coil 6a is desirably in a range of an angle of 90°±5° with respect to the magnetic field vectors H, and more desirably is perpendicular to the magnetic field vectors H.

Figure 13A:
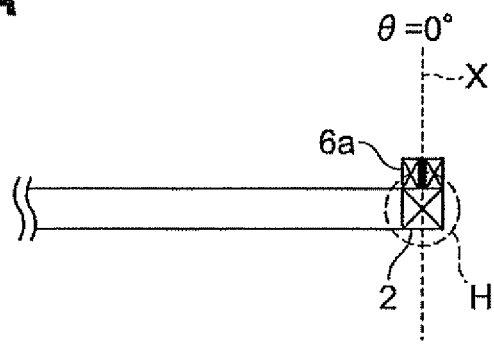
FIGS. 13A to 13C are diagrams showing a plurality of examples of arrangement of a detection coil with respect to a power feed coil.
Figure 13B:
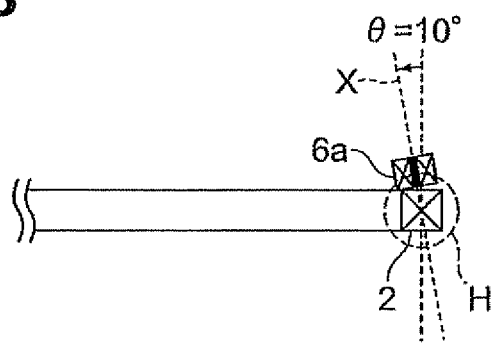
Figure 13C:
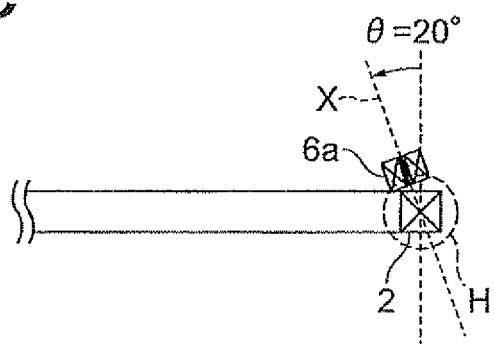

As shown in FIG. 13A, the detection coil 6a is arranged over the coil wire of the power feed coil 1. However, as shown in FIGS. 13B and 13C, the detection coil 6a may be provided at an inclination so as to surround the periphery of the coil wire of the power feed coil 1, along with the magnetic field vectors H, in such a manner that the central winding axis X of the coil is in a range of 90°±10° with respect to the magnetic field vectors H. For example, with respect to FIG. 13A (θ=0°), in FIG. 13B, the central winding axis X of the detection coil 6a is inclined by θ=10°, and in FIG. 13C, the central winding axis X of the detection coil 6a is inclined by θ=20°. Here, for example, if the detection coil 6a is arranged substantially directly above the coil wire of the power feed coil 1, then the radial direction R of the power feed coil 1 and the direction of the plane along the winding region of the power feed coil 1 (the power feed coil plane) may be set to the direction of the magnetic field vectors H. Furthermore, for example, the direction of the magnetic field vectors H produced by the power feed coil 1 may be set on the basis of electromagnetic field simulation, and moreover, the direction of the magnetic field vectors H may be measured directly using a Hall element. Furthermore, the position of the detection coil 6a is not limited in particular, provided that central winding axis X of the detection coil 6a is arranged at a position within a range of 90°±10° of the magnetic field vectors H produced by the power feed coil 1, but as shown in FIG. 1 or FIG. 13, desirably the detection coil 6a is arranged in the vicinity of the power feed coil 1 on the side where the power feed coil 1 and the power receive coil 7 are opposing, and more desirably, over the coil wire of the power feed coil 1.

Furthermore, in a detection resonance circuit which includes the detection coil 6a, the Q value is reduced by the detection resistance element 6b, thereby decreasing the resonance current in the detection resonance circuit. The purpose of the resonance current detector 6 is to monitor the resonance frequency on the power receiver side, and it is not necessary to pass a large current through the detection coil 6a. The detection resistance element 6b is a Q value reduction device of the detection resonance circuit, and as shown in FIG. 3, may be provided independently from the detection coil 6a and the detection capacitor 6c, or may be provided as an equivalent resistance component by using a detection coil 6a or a detection capacitor 6c having a small Q value.

Figure 7:
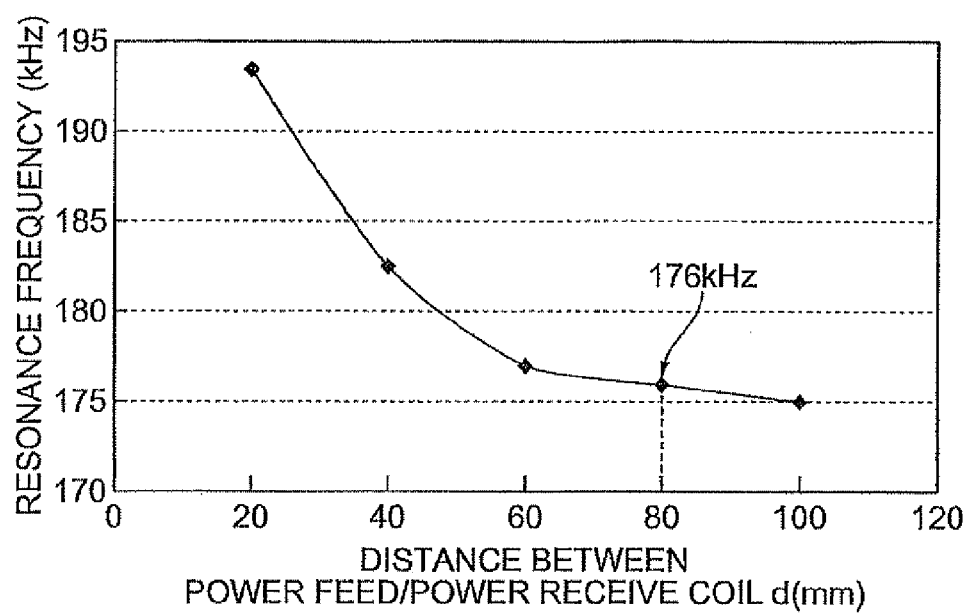
FIG. 7 is a diagram showing the resonance frequency with respect to the distance between the power feed coil and the power receive coil.

According to the wireless power feeder 110, the wireless power receiver 120 and the wireless power transmission system 100 of the first embodiment, even if the distance between the power feed coil 1 and the power receive coil 7 changes and the mutual inductance of the power feed coil 1 and the power receive coil 7 changes, the frequency of the AC current supplied to the power feed coil 1 is automatically controlled so as to match the frequency of the resonance current of the power receive resonance circuit 122, by the resonance current detector 6 and the control circuit 111, as shown in FIG. 7. Consequently, the power factor of the transmitted power is 1 and the transmitted power is a maximum, at all times.

Figure 8:
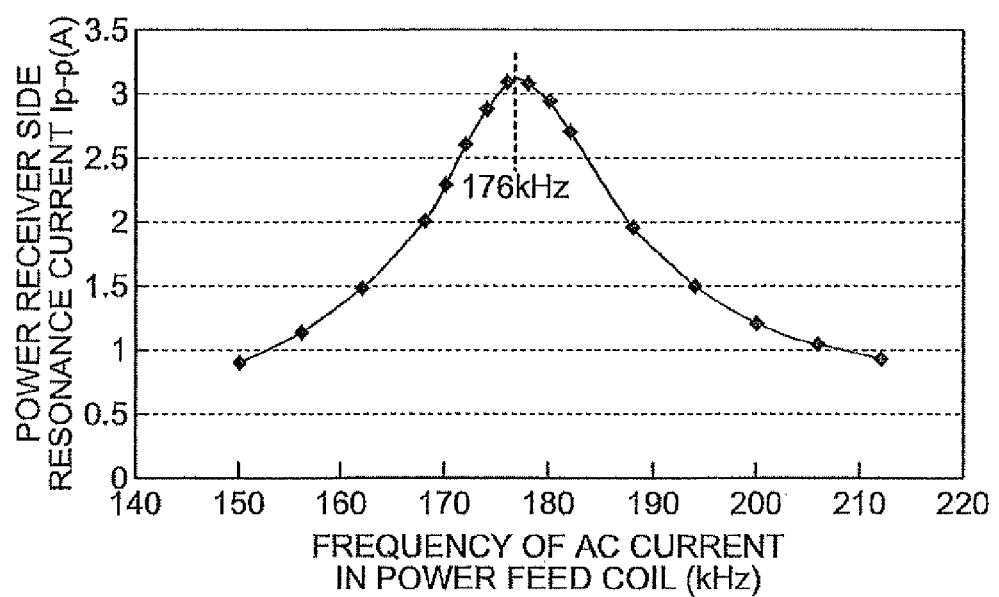
FIG. 8 is a diagram showing the resonance current of the power receive resonance circuit with respect to the frequency of the AC current in the power feed coil (the distance between the power feed coil and the power receive coil is 80 mm)

According to the wireless power feeder 110, the wireless power receiver 120 and the wireless power transmission system 100 of the first embodiment, the power feed coil 1 does not substantially constitute a resonance circuit, and hence there is one frequency at which the power factor of the transmitted power becomes 1, as shown in FIG. 8. Consequently, it is possible to prevent malfunction, if the phase frequency is controlled in such a manner that the power factor of the transmitted power is 1, in other words, in automatic control which makes the frequency of the AC current supplied to the power feed coil 1 match the frequency of the resonance current of the power receive resonance circuit 122 by means of a resonance current detector 6 and a control circuit 111.

In a wireless power feeder of this kind, normally, the resonance current of the power receive resonance circuit is detected by a non-contact method using a current sensor which detects a current flowing in a power feed coil, or a current transformer. However, if the resonance current is detected in this way, the power feed coil does not substantially constitute a resonance circuit, and therefore, if the distance between the power feed coil and the power receive coil becomes larger, for example, then it may be difficult to detect the resonance current of the power receive resonance circuit accurately. Hence, there has been room for improvement.

Therefore, in the wireless power feeder 110, the wireless power receiver 120 and the wireless power transmission system 100 according to the first embodiment, the winding region R6a of the detection coil 6a in the resonance current detector 6 is smaller than the winding region RE1 of the power feed coil 1, and the detection coil 6a is arranged in such a manner that the central winding axis X of the coil forms an angle of 90°±10° with respect to the magnetic field vectors (lines of magnetic force) H produced by the power feed coil 1. By this means, the resonance current detector 6 is able to obtain information about the state of resonance of the power receive resonance circuit 122 by a non-contact method, by using the magnetic field resonance effect between the detection coil 6a and the power receive coil 7, as well as being able accurately to detect the magnetic field of the power receive coil, without detecting the magnetic field of the power feed coil 1. The action and beneficial effects are verified below.

Figure 5B:
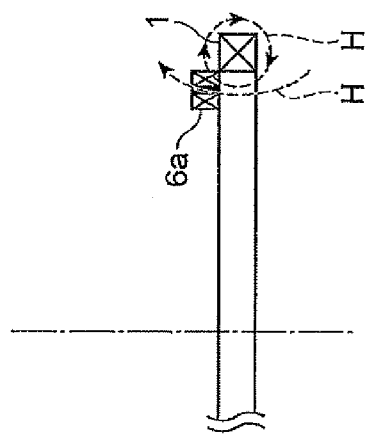
FIGS. 5A to 5D are diagrams showing a plurality of examples of arrangement of a detection coil with respect to a power feed coil.
Figure 5D:
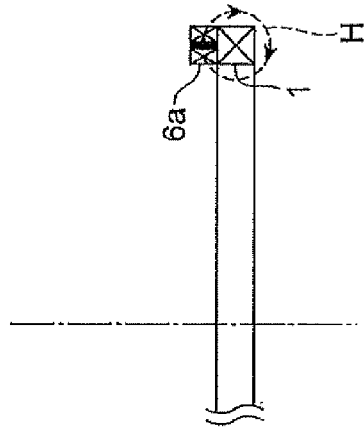
Figure 5A:
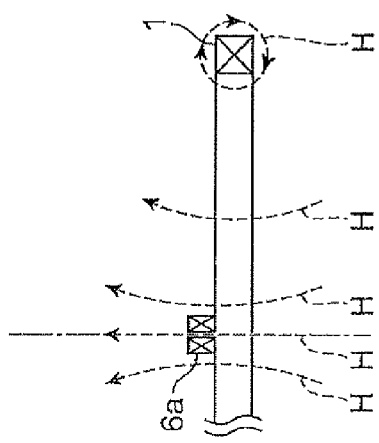
Figure 5C:
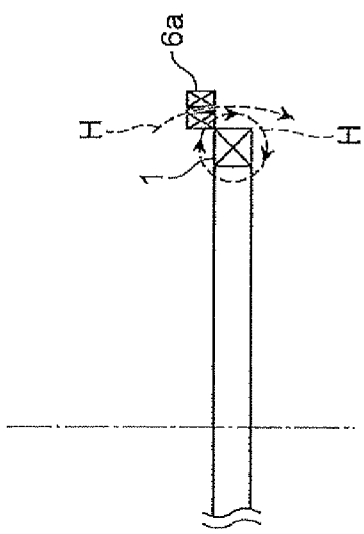

FIGS. 5A to 5D are diagrams showing different arrangements of the detection coil 6a. In FIG. 5A, the detection coil 6a is arranged on the central winding axis of the power feed coil 1 (for example, the center of the winding region of the power feed coil 1, if the wires of the power feed coil 1 are wound in a circular shape); in FIG. 5B, the detection coil 6a is arranged in the vicinity of the inner side of the coil wire of the power feed coil 1; and in FIG. 5C, the detection coil 6a is arranged in the vicinity of the outer side of the coil wire of the power feed coil 1. In FIG. 5D, the detection coil 6a is arranged substantially directly over the coil wire of the power feed coil 1, as in the present embodiment.

Furthermore, FIGS. 6A to 6D are diagrams showing states of magnetic field resonance which are detected by the detection coil 6a shown in FIGS. 5A to 5D. In FIGS. 6A to 6D, the current and the voltage at the ends of the detection capacitor 6c are detected, and the phase difference P6 between the voltage and current is shown. The phase difference is taken to be negative when the current phase is advanced with respect to a voltage phase, and is taken to be positive when the current phase is delayed with respect to same. In this measurement, the frequency is altered by forcibly changing the frequency of the VCO. Furthermore, for the purposes of comparison, the phase difference P7 between the voltage and the current of the power receive coil 7 is also shown as the state of resonance of the power receive coil 7. The voltage and the current of the power receive coil 7 are obtained using a current probe measurement instrument to directly probe the power receive coil 7. The distance between the detection coil 6a and the power receive coil 7 is 80 mm.

Furthermore, FIGS. 9A to 9D are diagrams respectively showing a schematic view of current based on a magnetic field of the power feed coil 1, the current being detected by the detection coils 6a shown in FIGS. 5A to 5D.

Figure 6B:
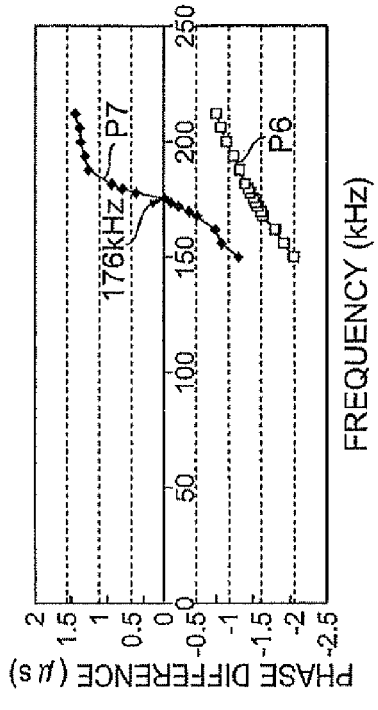
FIGS. 6A to 6D are diagrams showing a magnetic field resonance state detected by the detection coils shown in FIGS. 5A to 5D.
Figure 6D:
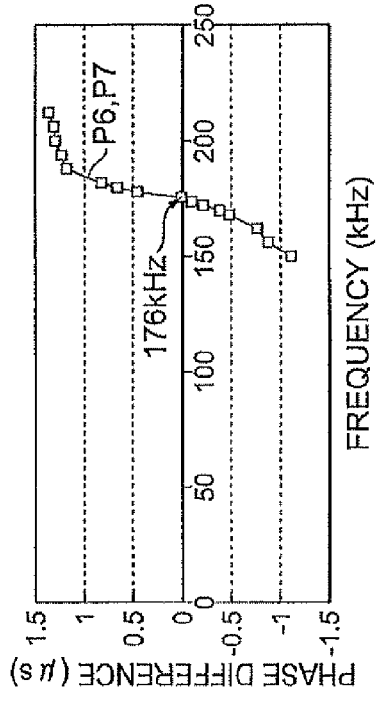
Figure 6A:
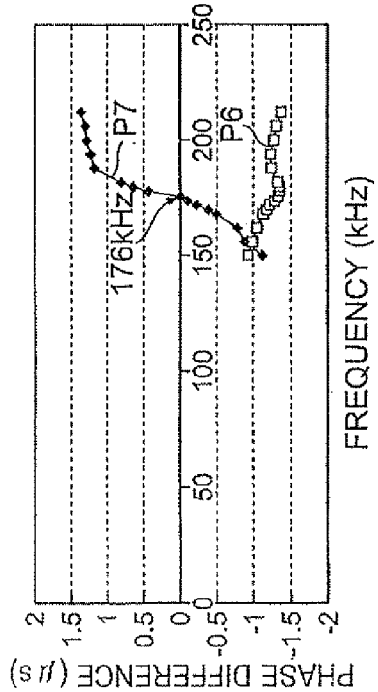
Figure 9B:
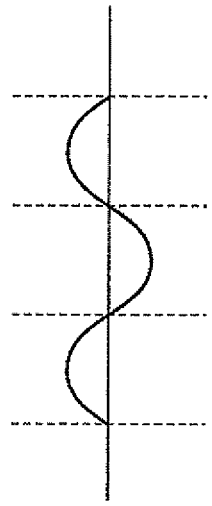
FIGS. 9A to 9D are diagrams showing a schematic view of current detected by the detection coils shown in FIGS. 5A to 5D, which is a current based on the magnetic field of the power feeder coil 1.
Figure 9D:
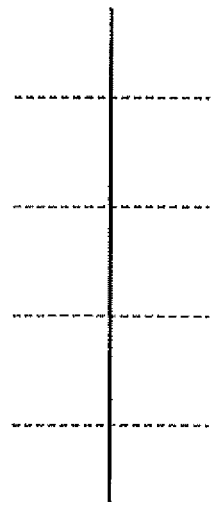
Figure 9A:
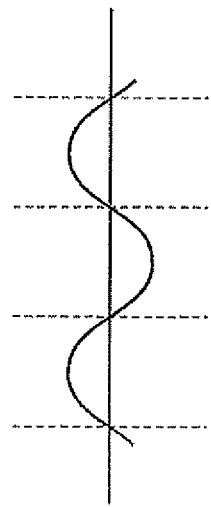

According to FIG. 6A, when the detection coil 6a is arranged on the central winding axis of the power feed coil 1, then the phase difference P6 between the voltage and the current of the detection resonance circuit 112 does not match the phase difference P7 between the voltage and current of the power receive resonance circuit 122, and hence there is no frequency (control point of the control circuit) where the phase difference P6 becomes zero. Accordingly, with the arrangement of the detection coil 6a shown in FIG. 5A, it is difficult to detect the resonance state of the power receive resonance circuit 122. This is thought to be because, as shown in FIG. 9A, the detection coil 6a also detects the magnetic field of the power feed coil 1, and therefore the phase of the magnetic field generated by the power receive coil 7 cannot be detected accurately.

Similarly, according to FIG. 6B, when the detection coil 6a is arranged in the vicinity of the inner side of the coil wire of the power feed coil 1, then the phase difference P6 between the voltage and the current in the detection resonance circuit 112 does not match the phase difference P7 between the voltage and the current of the power receive resonance circuit 122, and hence there is no frequency where the phase difference P6 becomes zero. Accordingly, with the arrangement of the detection coil 6a shown in FIG. 5B, it is difficult to detect the resonance state of the power receive resonance circuit 122. This is thought to be because, as shown in FIG. 9B, the detection coil 6a also detects the magnetic field of the power feed coil 1, and therefore the phase of the magnetic field generated by the power receive coil 7 cannot be detected accurately.

Figure 6C:
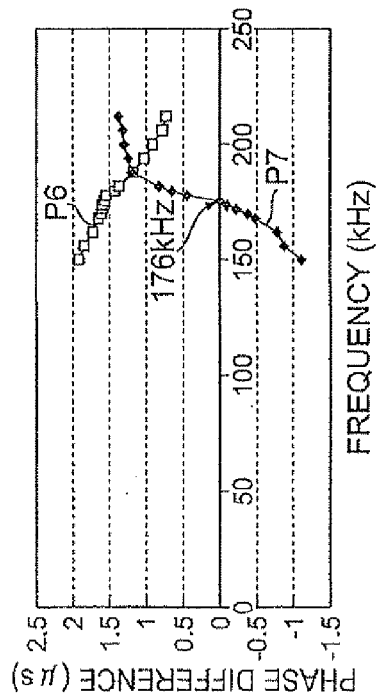
Figure 9C:
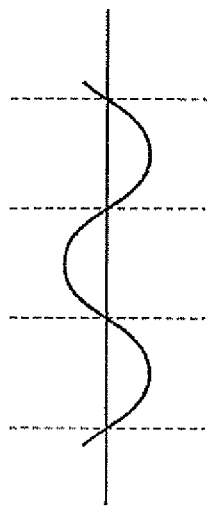

Similarly, according to FIG. 6C, when the detection coil 6a is arranged in the vicinity of the outer side of the coil wire of the power feed coil 1, then the phase difference P6 between the voltage and the current in the detection resonance circuit 112 does not match the phase difference P7 between the voltage and current of the power receive resonance circuit 122, and hence there is no frequency where the phase difference P6 becomes zero. Accordingly, with the arrangement of the detection coil 6a shown in FIG. 5C, it is difficult to detect the resonance state of the power receive resonance circuit 122. This is thought to be because, as shown in FIG. 9C, the detection coil 6a also detects the magnetic field (opposite phase) of the power feed coil 1, and therefore the correct phase of the magnetic field generated by the power receive coil 7 cannot be detected.

On the other hand, according to FIG. 6D, when the detection coil 6a is arranged substantially directly above the coil wire of the power feed coil 1, as in the present embodiment, then the phase difference P6 between the voltage and the current in the detection resonance circuit 112 matches the phase difference P7 between the voltage and the current of the power receive resonance circuit 122. Therefore, with the arrangement of the detection coil 6a shown in FIG. 5D, it is possible to detect the resonance state of the power receive resonance circuit 122 accurately. This is because the central winding axis X of the detection coil 6a is perpendicular to the magnetic field vectors H produced by the power feed coil 1, and as shown in FIG. 9D, the detection coil 6a principally detects the magnetic field generated by the power receive coil 7, without detecting the magnetic field generated by the power feed coil 1.

Second Embodiment

Figure 4:
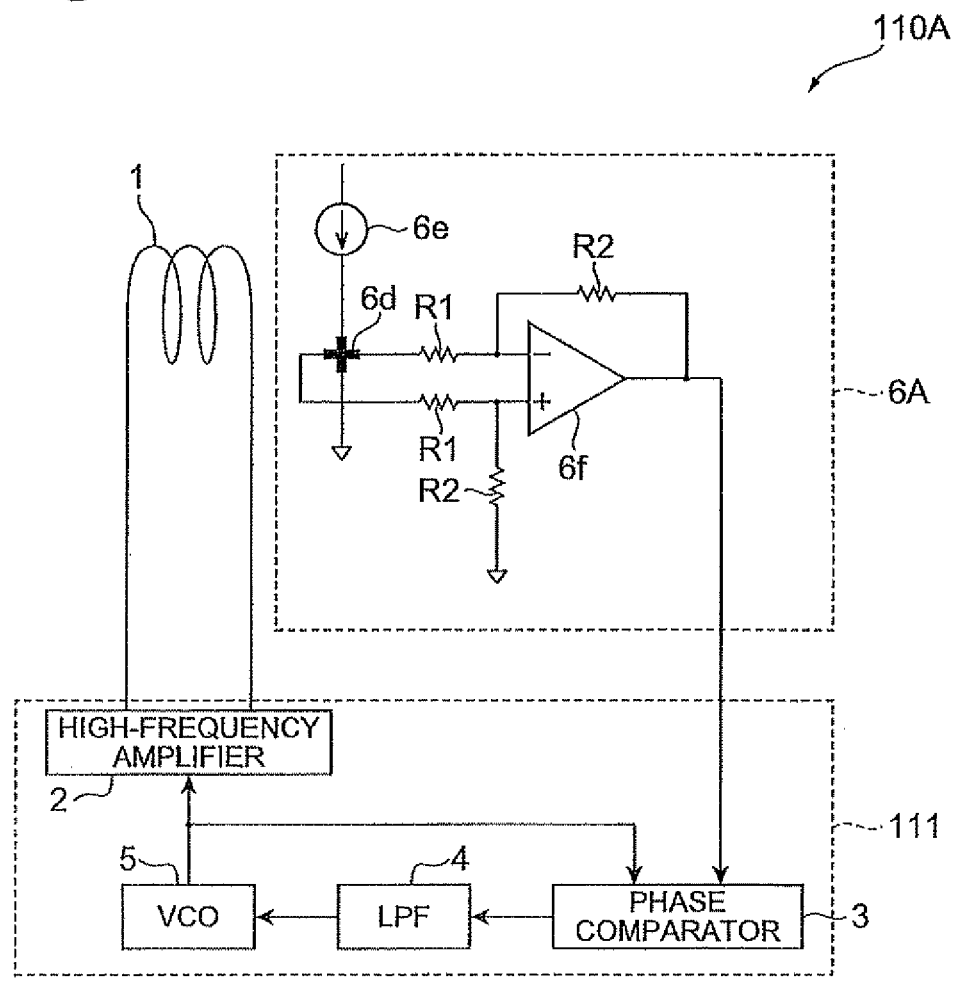
FIG. 4 is a diagram showing the electrical composition of a wireless power feeder relating to a second embodiment of the present invention.

FIG. 4 is a diagram showing the electrical composition of a wireless power feeder 110A relating to a second embodiment of the present invention. In this way, the wireless power transmission system 100 may comprise a wireless power feeder 110A instead of the wireless power feeder 110.

The wireless power feeder 110A differs from the first embodiment in that a resonance current detector 6A is provided instead of the resonance current detector 6 in the wireless power feeder 110. The rest of the composition of the wireless power feeder 110A is the same as the wireless power feeder 110.

The resonance current detector 6A comprises a Hall element (magnetic detection element, magnetic sensor) 6d, a current source 6e, an operating amplifier 6f and resistance elements R1 and R2, instead of the detection resonance circuit 112 which is constituted by the detection coil 6a, the detection resistance element 6b and the detection capacitor 6c, in the resonance current detector 6.

The Hall element 6d is driven by a current from the current source 6e, a voltage corresponding to the resonance current of the power receive coil 7 is generated on the basis of the magnetic field generated by the power receive coil 7, and this voltage is output to the operating amplifier 6f via the resistance element R1. A resistance element R2 is connected between the negative input terminal and the output terminal of the operating amplifier 6f, and the resistance element R2 is connected between the positive input terminal and an earth potential. The operating amplifier 6f amplifies the signal by an amplification rate expressed by R2/R1.

The outer shape of the Hall element 6d is sufficiently smaller than the winding region RE1 of the power feed coil 1. For example, the outer shape of the Hall element 6d is desirably no more than 1/10 of the length r1 of the winding region RE1 of the power feed coil 1 (the winding diameter in the case of a circular shape), in the radial direction R of winding of the power feed coil 1, and more desirably, no more than the length d1 of the coil wire region of the power feed coil 1 in the radial direction R of winding (the winding width of the coil wire; in other words, the diameter of the coil if the number of windings of the power feed coil 1 is one).

Figure 14A:
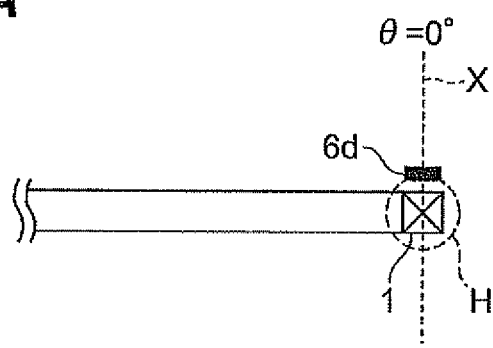
FIGS. 14A and 14B are diagrams showing a plurality of examples of arrangement of a magnetic detection element with respect to a power feed coil.
Figure 14B:
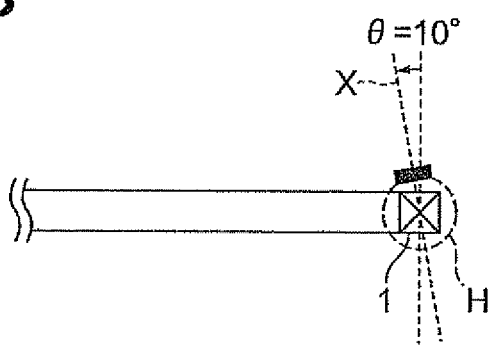

Furthermore, as shown in FIGS. 14A and 14B, the Hall element 6d is arranged in such a manner that the magnetic detection direction X forms an angle of 90°±10° with respect to the magnetic field vectors (lines of magnetic force) H generated by the power feed coil 1. The magnetic detection direction X of the Hall element 6d desirably forms an angle of 90°±5° with respect to the magnetic field vectors H, and more desirably is perpendicular to the magnetic field vectors H.

Figure 2D:
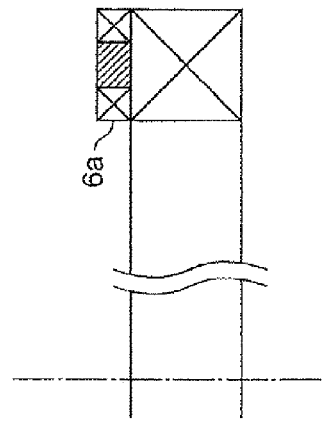

More specifically, as shown in FIG. 2D and FIG. 14A, the Hall element 6d is arranged over the winding of the power feed coil 1. However, as shown in FIG. 14B, the Hall element 6d may be provided at an inclination so as to surround the periphery of the coil wire of the power feed coil 1, along with the magnetic field vectors H, in such a manner that the magnetic detection direction X fowls an angle of 90°±10° with respect to the magnetic field vectors H. For example, with respect to FIG. 14A (θ=0°), in FIG. 14B, the magnetic detection direction X of the Hall element 6d is inclined at an angle of θ=10°.

It is also possible to use a magnetic sensor, such as a GMR element, a TMR element, or the like, instead of the Hall element 6d.

In the wireless power feeder 110A according to this second embodiment, it is possible to obtain similar advantages to the wireless power feeder 110 of the first embodiment.

Third Embodiment

Figure 11:
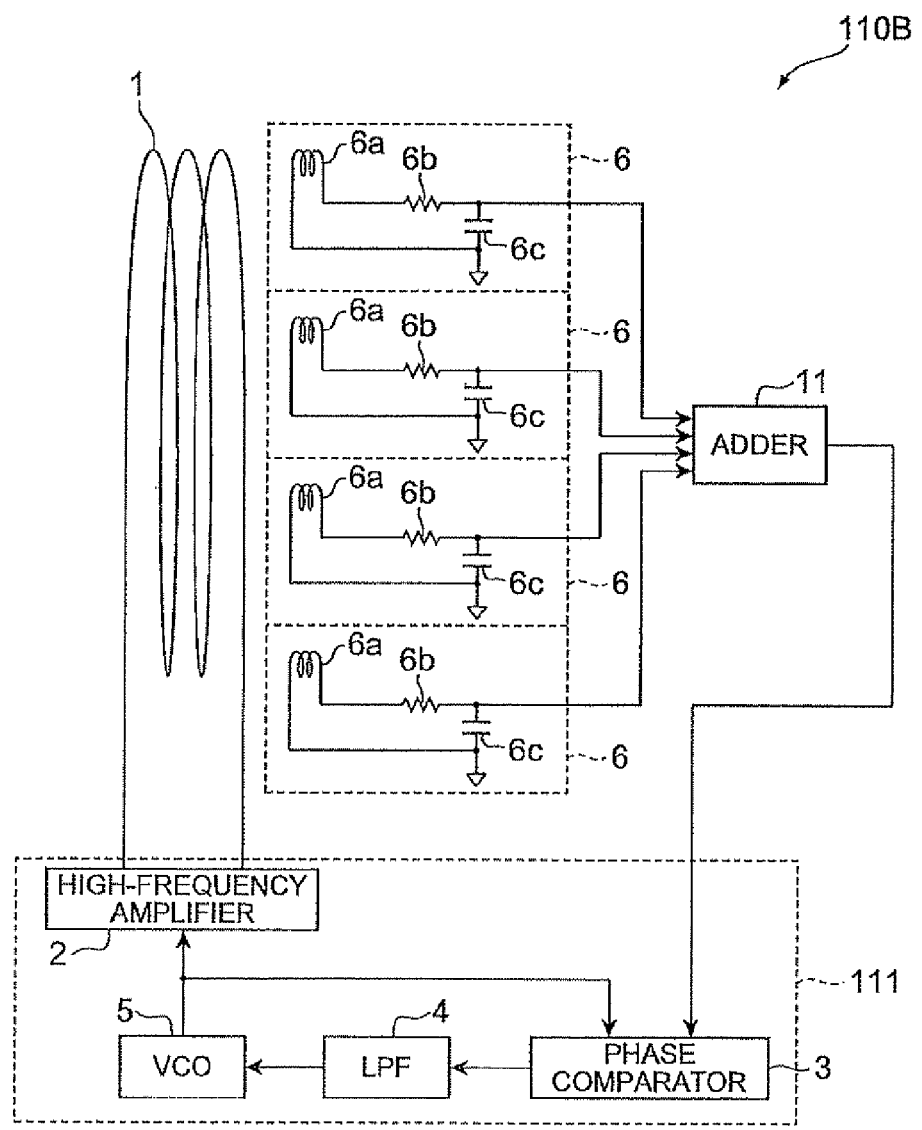
FIG. 11 is a diagram showing the electrical composition of a wireless power feeder relating to a third embodiment of the present invention.

FIG. 11 is a diagram showing the electrical composition of a wireless power feeder 110B relating to a third embodiment of the present invention. In this way, the wireless power transmission system 100 may comprise a wireless power feeder 110B instead of the wireless power feeder 110.

The wireless power feeder 110B differs from the first embodiment in that four resonance current detectors 6 are provided, together with an adder 11, instead of the resonance current detector 6 in the wireless power feeder 110. The adder 11 adds up the voltages at either end of the detection capacitors 6c in the four resonance current detectors 6, and outputs the result to the phase comparator 3. The rest of the composition of the wireless power feeder 110B is the same as the wireless power feeder 110.

FIG. 10A is a diagram showing an arrangement of the detection coils 6a in the four resonance current detectors 6 with respect to the power feed coil 1, as viewed from the side of the power receive coil, and FIG. 10B is a cross-sectional diagram along line X-X in FIG. 10A. The detection coils 6a are arranged equidistantly, 90° apart respectively, over the winding circumference of the power feed coil 1.

In the wireless power feeder 110B according to this third embodiment, it is possible to obtain similar advantages to the wireless power feeder 110 of the first embodiment.

Figure 12A:
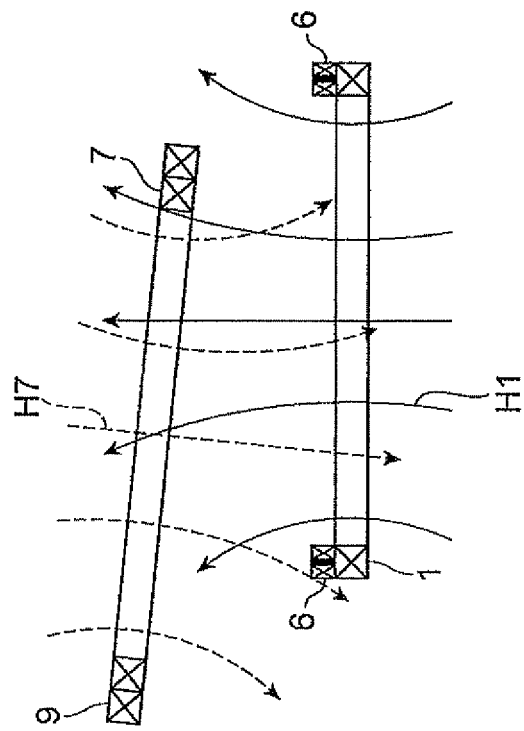
FIGS. 12A and 12B are diagrams showing a schematic view of positional displacement between the power feed coil and the power receive coil.
Figure 12B:
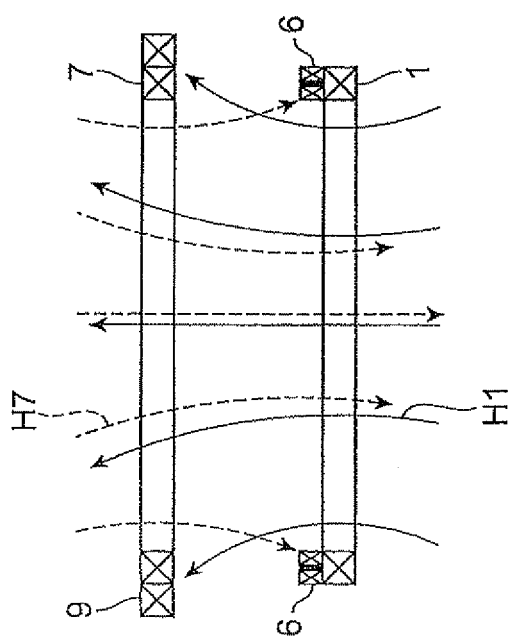

Moreover, according to the wireless power feeder 110B of the third embodiment, as shown in FIG. 12A, the central winding axis of the power feed coil 1 and the central winding axis of the power receive coil 7 match each other (the power receive coil 7 is positioned directly over the power feed coil 1), and it is possible to detect the resonance current of the power receive resonance circuit 122 efficiently, not only when the power feed coil 1 and the power receive coil 7 are mutually parallel, but also when the power receive coil 7 is inclined obliquely with respect to the power feed coil 1, as shown in FIG. 12B (when the power receive coil 7 and the power feed coil 1 are displaced relative to each other in the lateral direction and are not parallel).

The present invention is not limited to the present embodiments described above and can be modified in various ways. For example, in the third embodiment, a mode is described in which four resonance current detectors are provided, but the number of resonance current detectors is not limited to this. For example, there may be two or three resonance current detectors, or five or more resonance current detectors. Furthermore, these resonance current detectors may not be arranged equidistantly over the winding circumference of the power feed coil.

Figure 15:
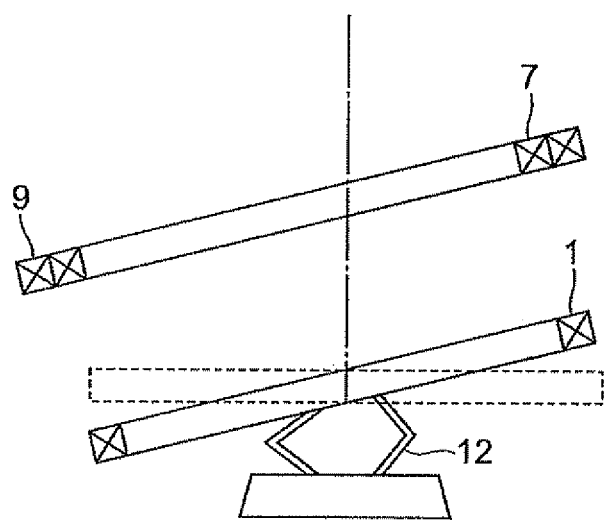
FIG. 15 is a cross-sectional diagram showing the composition of the principal part of a wireless power transmission system, a wireless power feeder and a wireless power receiver relating to a modification example of the present invention.

Furthermore, in the third embodiment, an example is described in which displacement of the power receive coil with respect to the power feed coil is eliminated by providing a plurality of resonance current detectors, but as shown in FIG. 15, this can also be eliminated by providing an actuator unit 12. In a case where the winding plane of the power receive coil 7 obliquely opposes the winding plane of the power feed coil 1, as in FIG. 15, the actuator unit 12 is controlled in such a manner that the winding plane of the power feed coil 1 and the winding plane of the power receive coil 7 are parallel at all times. By this means, the power transmission efficiency is improved, and if a resonance current detector is also provided, it is possible to detect the magnetic field resonance state more stably.

Moreover, in the present embodiment, the control circuit 111 controls in such a manner that the frequency of the AC current supplied to the power feed coil 1 and the frequency of the resonance current of the power receiver side resonance circuit 122 are matching, but even if the frequency of the AC current and the resonance frequency of the power receive resonance circuit 122 are not completely matching, for example, if they are substantially matching (are associated) within a range of error of about ±20%, it is possible to raise the power factor of the transmitted power and high-efficiency power transmission can be carried out.

Furthermore, in the present embodiment, the control circuit 111 implements control in such a manner that an AC current having a frequency matching the frequency of the resonance current of the power receiver side resonance circuit 122 is supplied to the power feed coil 1, and the frequency of the resonance current of the power receiver side resonance circuit 122 and the frequency of the AC current supplied to the power feed coil 1 match each other, but the control circuit 111 may also implement control to make the frequency of the AC current supplied to the power feed coil 1 substantially match the frequency of the resonance current of the power receiver side resonance circuit 122, by adjusting the inductance of the power feed coil 1, for example.

The characteristic features of the present invention can also be applied to signal transmission, as well as power transmission. For example, the wireless power transmission system according to the present invention can also be applied to a case where an analog signal or digital signal is transmitted by a non-contact method using a magnetic field resonance effect.

The present invention can be applied to: (1) non-contact power feed or charging of a domestic appliance, such as a portable telephone, music player, TV or game machine controller, LED lighting, or the like; (2) non-contact power feed or charging of industrial equipment, such as a factory-based conveyance robot, a biped robot, a cleaning robot, or the like; (3) non-contact charging of a HEV, EV, or the like, in which a power receive coil is disposed in a vehicle and a power feed coil is buried in a parking space, roadway, or the like, for example; (4) non-contact power feed or charging of a domestic appliance, lighting, or the like, inside a home, from solar power generation.

In the present specification, the element for achieving a magnetic field resonance effect is called a "coil", but depending on the related technological field, it may also be called a "transmitter", "antenna", or the like.

Above, the principles of the present invention were described in relation to preferred embodiments, but it is recognized by persons skilled in the art that the present invention can be modified in terms of the arrangement and detailed composition, without deviating from these principles. The present invention is not limited to the specific composition disclosed in the embodiments. Consequently, rights are claimed in respect of all revisions and modifications originating from the range of the claims and the spirit of the claims.

What is claimed is:

1. A wireless power feeder which performs power feed by a non-contact method to a wireless power receiver having a power receive resonance circuit including a power receive coil and a power receive capacitor, the wireless power feeder comprising:
   a power feed coil;
   a resonance current detector which detects a resonance current of the power receive resonance circuit; and
   a control circuit which performs power feed from the power feed coil to the power receive coil, on the basis of a magnetic field resonance effect between the power feed coil and the power receive coil, by supplying AC current to the power feed coil, and which associates a frequency of the AC current with a frequency of the resonance current detected by the resonance current detector, wherein
   the power feed coil does not substantially constitute a resonance circuit;
   the resonance current detector has a detection resonance circuit which includes a detection coil and a detection capacitor, and detects a resonance current of the power receive resonance circuit on the basis of a magnetic field resonance effect between the detection coil and the power receive coil;
   a winding region of the detection coil in the resonance current detector is smaller than a winding region of the power feed coil; and
   the detection coil in the resonance current detector is disposed such that a central winding axis of the detection coil forms an angle of not less than 80° and not more than 100° with respect to magnetic field vectors generated by the power feed coil.

2. The wireless power feeder according to claim 1, wherein a length of the winding region of the detection coil in the resonance current detector, which is the length of the winding region of the detection coil in a radial direction of winding of the power feed coil, is not more than ¹⁄₁₀ of the length of the winding region of the power feed coil in the radial direction of winding.

3. The wireless power feeder according to claim 1, wherein a length of the winding region of the detection coil in the resonance current detector, which is the length of the winding region of the detection coil in a radial direction of winding of the power feed coil, is not more than a length of a coil wire region of the power feed coil in the radial direction of winding.

4. The wireless power feeder according to claim 2, wherein the detection coil in the resonance current detector is disposed over a coil wire of the power feed coil.

5. The wireless power feeder according to claim 3, wherein the detection coil in the resonance current detector is disposed over the coil wire of the power feed coil.

6. The wireless power feeder according to claim 1, wherein the resonance current detector further comprises a detection resistance element for reducing a Q value of the detection resonance circuit.

7. The wireless power feeder according to claim 1, further comprising a plurality of resonance current detectors and an adder which adds up output signals from a plurality of resonance current detectors; and
   the control circuit associates the frequency of the AC current with the frequency of the output signal from the adder.

8. A wireless power feeder which performs power feed by a non-contact method to a wireless power receiver having a power receive resonance circuit including a power receive coil and a power receive capacitor, the wireless power feeder comprising:
   a power feed coil;
   a resonance current detector which detects a resonance current of the power receive resonance circuit; and
   a control circuit which performs power feed from the power feed coil to the power receive coil, on the basis of a magnetic field resonance effect between the power feed coil and the power receive coil, by supplying AC current to the power feed coil, and which associates a frequency of the AC current with a frequency of the resonance current detected by the resonance current detector, wherein
   the power feed coil does not substantially constitute a resonance circuit;
   the resonance current detector has a magnetic detection element and detects a resonance current of the power receive resonance circuit, on the basis of a magnetic field of the power receive coil;
   an outer shape of the magnetic detection element in the resonance current detector is smaller than a winding region of the power feed coil; and
   the magnetic detection element in the resonance current detector is disposed such that the magnetic detection direction forms an angle of not less than 80° and not more than 100° with respect to magnetic field vectors generated by the power feed coil.

9. A wireless power receiver which acquires power by a non-contact method from the wireless power feeder according to claim 1, comprising a power receive resonance circuit including a power receive coil and a power receive capacitor,
   the wireless power receiver acquiring power from the power feed coil by the power receive coil on the basis of a magnetic field resonance effect between the power feed coil in the wireless power feeder and the power receive coil in the wireless power receiver.

10. A wireless power transmission system which performs power transmission by a non-contact method between the wireless power feeder according to claim 1 and the wireless power receiver, wherein power transmission is performed from the power feed coil to the power receive coil on the basis of a magnetic field resonance effect between the power feed coil in the wireless power feeder and the power receive coil in the wireless power receiver.

\* \* \* \* \*